(12) United States Patent
Danilov et al.

(10) Patent No.: US 10,936,196 B2
(45) Date of Patent: Mar. 2, 2021

(54) DATA CONVOLUTION FOR GEOGRAPHICALLY DIVERSE STORAGE

(71) Applicant: EMC IP Holding Company LLC, Hopkinton, MA (US)

(72) Inventors: Mikhail Danilov, Saint Petersburg (RU); Kirill Zakharov, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 29 days.

(21) Appl. No.: 16/010,246

(22) Filed: Jun. 15, 2018

(65) Prior Publication Data

US 2019/0384499 A1 Dec. 19, 2019

(51) Int. Cl.
*G06F 3/06* (2006.01)
*G06F 11/10* (2006.01)

(52) U.S. Cl.
CPC ............ *G06F 3/0608* (2013.01); *G06F 3/064* (2013.01); *G06F 3/065* (2013.01); *G06F 3/067* (2013.01); *G06F 3/0644* (2013.01); *G06F 11/1076* (2013.01); *G06F 2211/1028* (2013.01)

(58) Field of Classification Search
CPC .............................................. G06F 2211/1028
See application file for complete search history.

(56) References Cited

U.S. PATENT DOCUMENTS

| | | | |
|---|---|---|---|
| 5,675,802 A | 10/1997 | Allen et al. | |
| 5,805,788 A | 9/1998 | Johnson | |
| 5,950,225 A * | 9/1999 | Kleiman | G06F 11/1076 711/111 |
| 7,389,393 B1 * | 6/2008 | Karr | G06F 3/0613 711/103 |
| 7,680,875 B1 | 3/2010 | Shopiro et al. | |
| 7,721,044 B1 | 5/2010 | Chatterjee et al. | |
| 8,370,542 B2 | 2/2013 | Lu et al. | |
| 8,479,037 B1 | 7/2013 | Chatterjee et al. | |
| 8,495,465 B1 | 7/2013 | Anholt et al. | |
| 8,751,740 B1 | 6/2014 | De Forest et al. | |

(Continued)

OTHER PUBLICATIONS

Stonebreaker et al. "Distributed RAID—A New Multiple Copy Algorithm." 1990. IEEE. ICDE 1990. pp. 430-437. (Year: 1990).*

(Continued)

*Primary Examiner* — Nathan Sadler
(74) *Attorney, Agent, or Firm* — Amin, Turocy & Watson, LLP

(57) ABSTRACT

Data convolution for geographically diverse storage is disclosed. Data chunks stored in storage devices of different zones of a zone storage system can be convolved to conserve memory. The zone storage system can be a geographically diverse storage system. A convolved chunk can be stored at a zone that does not contribute to the data represented in the convolved chunk. In an aspect, a copy of a first chunk from a first zone can be created at a third zone, which can facilitate convolving the data of the copy with data from a second zone as the data from the second chunk of the second zone is received at the third zone, e.g., without having to create a local copy of the second chunk, which can be termed 'on-arrival convolving' or other similar terms. The copy of the first chunk can then be deleted. Copies of the convolved chunk can be created.

20 Claims, 10 Drawing Sheets

(56) References Cited

U.S. PATENT DOCUMENTS

| | | |
|---|---|---|
| 8,799,746 B2 | 8/2014 | Baker et al. |
| 8,832,234 B1 | 9/2014 | Brooker et al. |
| 8,856,619 B1 | 10/2014 | Cypher |
| 8,972,478 B1 | 3/2015 | Storer et al. |
| 9,003,086 B1 | 4/2015 | Schuller et al. |
| 9,063,838 B1 | 6/2015 | Boyle et al. |
| 9,208,009 B2 | 12/2015 | Resch et al. |
| 9,244,761 B2 | 1/2016 | Yekhanin et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,477,682 B1 | 10/2016 | Bent et al. |
| 9,641,615 B1 | 5/2017 | Robins et al. |
| 9,747,057 B1 | 8/2017 | Ramani et al. |
| 9,864,527 B1 | 1/2018 | Srivastav et al. |
| 10,055,145 B1 | 8/2018 | Danilov et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,361,810 B2 | 7/2019 | Myung et al. |
| 10,496,330 B1 | 12/2019 | Bernat et al. |
| 10,503,611 B1 | 12/2019 | Srivastav et al. |
| 10,613,780 B1 | 4/2020 | Naeni et al. |
| 10,733,053 B1 | 8/2020 | Miller et al. |
| 2002/0166026 A1 | 11/2002 | Ulrich et al. |
| 2005/0080982 A1 | 4/2005 | Vasilevsky et al. |
| 2005/0088318 A1 | 4/2005 | Liu et al. |
| 2005/0140529 A1 | 6/2005 | Choi et al. |
| 2005/0234941 A1 | 10/2005 | Watanabe |
| 2006/0047896 A1* | 3/2006 | Nguyen .............. G06F 11/1076 711/112 |
| 2006/0075007 A1 | 4/2006 | Anderson et al. |
| 2006/0143508 A1 | 6/2006 | Mochizuki et al. |
| 2007/0076321 A1 | 4/2007 | Takahashi et al. |
| 2007/0239759 A1 | 10/2007 | Shen et al. |
| 2007/0250674 A1 | 10/2007 | Fineberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0172464 A1* | 7/2009 | Byrne ................. G06F 11/1092 714/5.11 |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0218037 A1 | 8/2010 | Swartz et al. |
| 2010/0293348 A1 | 11/2010 | Ye et al. |
| 2010/0332748 A1* | 12/2010 | van der Goot ....... G06F 3/0613 711/114 |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0196833 A1 | 8/2011 | Drobychev et al. |
| 2011/0246503 A1 | 10/2011 | Bender et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0238932 A1 | 9/2013 | Resch |
| 2013/0246876 A1 | 9/2013 | Manssour et al. |
| 2013/0290482 A1 | 10/2013 | Leggette |
| 2014/0040417 A1 | 2/2014 | Gladwin et al. |
| 2014/0064048 A1 | 3/2014 | Cohen et al. |
| 2014/0115182 A1 | 4/2014 | Sabaa et al. |
| 2014/0164430 A1 | 6/2014 | Hadjieleftheriou et al. |
| 2014/0164694 A1 | 6/2014 | Storer |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrieri et al. |
| 2014/0359244 A1 | 12/2014 | Chambliss et al. |
| 2014/0380088 A1* | 12/2014 | Bennett ............. G06F 11/2058 714/6.2 |
| 2014/0380125 A1* | 12/2014 | Calder .................. G06F 11/10 714/766 |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0178007 A1 | 6/2015 | Moisa et al. |
| 2015/0186043 A1 | 7/2015 | Kesselman et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0162378 A1 | 6/2016 | Garlapati et al. |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0328295 A1* | 11/2016 | Baptist ............... G06F 11/1076 |
| 2016/0357649 A1 | 12/2016 | Karrotu et al. |
| 2016/0371145 A1* | 12/2016 | Akutsu ................ G06F 3/0619 |
| 2016/0378624 A1 | 12/2016 | Jenkins, Jr. et al. |
| 2016/0380650 A1* | 12/2016 | Calder ............... G06F 11/1076 714/766 |
| 2017/0003880 A1 | 1/2017 | Fisher et al. |
| 2017/0004044 A1 | 1/2017 | Tormasov et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0235507 A1 | 8/2017 | Sinha et al. |
| 2017/0262187 A1 | 9/2017 | Manzanares et al. |
| 2017/0286516 A1 | 10/2017 | Horowitz et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074881 A1 | 3/2018 | Burden |
| 2018/0121286 A1 | 5/2018 | Sipos |
| 2018/0129417 A1 | 5/2018 | Sivasubramanian et al. |
| 2018/0181324 A1* | 6/2018 | Danilov ............... G06F 3/0619 |
| 2018/0181612 A1* | 6/2018 | Danilov ............... G06F 16/27 |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0114223 A1 | 4/2019 | Pydipaty et al. |
| 2019/0205437 A1 | 7/2019 | Larson et al. |

(56) References Cited

U.S. PATENT DOCUMENTS

| | | | |
|---|---|---|---|
| 2019/0215017 | A1 | 7/2019 | Danilov et al. |
| 2019/0220207 | A1 | 7/2019 | Lingarajappa |
| 2019/0384500 | A1* | 12/2019 | Danilov ............... G06F 3/0608 |
| 2019/0386683 | A1* | 12/2019 | Danilov ............... G06F 3/0619 |
| 2020/0026810 | A1 | 1/2020 | Subramaniam et al. |
| 2020/0050510 | A1 | 2/2020 | Chien et al. |
| 2020/0104377 | A1 | 4/2020 | Earnesty, Jr. et al. |
| 2020/0117556 | A1 | 4/2020 | Zou et al. |

OTHER PUBLICATIONS

Muralidhar et al. "f4: Facebook's Warm BLOB Storage System." Oct. 2014. USENIX. OSDI 2014. pp. 383-398. (Year: 2014).*

Office Action dated Nov. 16, 2018 for U.S. Appl. No. 15/662,273, 19 pages.

Non-Final Office Action received for U.S. Appl. No. 15/794,950 dated Jul. 9, 2019, 29 pages.

Final Office Action received for U.S. Appl. No. 15/651,504 dated Sep. 18, 2019, 15 pages.

Non-Final Office Action received for U.S. Appl. No. 15/952,179 dated Sep. 10, 2019, 42 pages.

Non-Final Office Action received for U.S. Appl. No. 15/651,504 dated Mar. 21, 2019, 10 pages.

Final Office Action received for U.S. Appl. No. 15/662,273 dated May 15, 2019, 33 pages.

Non-Final Office Action received for U.S. Appl. No. 15/965,479 dated Apr. 15, 2019, 21 pages.

Wikipedia, "Standard Raid Levels—RAID 6", URL: https://en.wikipedia.org/wiki/Standard_RAID_levels#RAID_6, Oct. 18, 2019, 11 pages.

Non-Final Office Action received for U.S. Appl. No. 15/656,382 dated Nov. 1, 2019, 47 pages.

Final Office Action received for U.S. Appl. No. 15/952,179 dated Nov. 26, 2019, 53 pages.

Non Final Office Action received for U.S. Appl. No. 16/024,314 dated Nov. 25, 2019, 42 pages.

Non-Final Office Action dated Dec. 2, 2019 for U.S. Appl. No. 16/177,278, 55 pages.

Non-Final Office Action received for U.S. Appl. No. 15/651,504 dated Dec. 31, 2019, 18 pages.

Office Action dated Feb. 5, 2020 for U.S. Appl. No. 16/261,551, 30 pages.

Non-Final Office Action received for U.S. Appl. No. 16/228,612 dated Feb. 27, 2020, 49 pages.

Final Office Action received for U.S. Appl. No. 15/656,382 dated Apr. 6, 2020, 31 pages.

Final Office Action dated Feb. 12, 2020 for U.S. Appl. No. 16/024,314, 29 pages.

Non-Final Office Action received for U.S. Appl. No. 16/010,255 dated Jan. 9, 2020, 31 pages.

Non-Final Office Action received for U.S. Appl. No. 15/582,167 dated Sep. 7, 2018, 19 pages.

Non-Final Office Action received for U.S. Appl. No. 15/952,179 dated Apr. 20, 2020, 68 pages.

Notice of Allowance received for U.S. Appl. No. 16/240,193, dated May 4, 2020, 46 pages.

Final Office Action received for U.S. Appl. No. 16/177,278, dated May 11, 2020, 53 pages.

Non-Final Office Action received for U.S. Appl. No. 16/231,018 dated May 8, 2020, 78 pages.

Notice of Allowance dated May 11, 2020 for U.S. Appl. No. 16/240,193, 24 pages.

Non-Final Office Action received for U.S. Appl. No. 16/228,624 dated Jun. 24, 2020, 65 pages.

Non-Final Office Action received for U.S. Appl. No. 16/240,272 dated Jun. 29, 2020, 64 pages.

Non-Final Office Action received for U.S. Appl. No. 16/228,612 dated Jun. 29, 2020, 62 pages.

Final Office Action received for U.S. Appl. No. 16/010,255 dated Jul. 23, 2020, 36 pages.

Non-Final Office Action received for U.S. Appl. No. 16/209,185 dated Jun. 18, 2020, 22 pages.

Martin Hosken, Developing a Hyper-Converged Storage Strategy for VMware vCloud Director with VMware vSAN, Jan. 2018 (Year: 2018).

Non-Final Office Action received for U.S. Appl. No. 16/261,549 dated Apr. 15, 2020, 22 pages.

Non-Final Office Action received for U.S. Appl. No. 16/374,726 dated Jun. 2, 2020, 47 pages.

Natarajan, RAID 0, RAID 1, RAID 5, RAID 10 Explained with Diagrams, Aug. 10, 2010, thegeekstuff.com (18 pages).

Non-Final Office Action received for U.S. Appl. No. 16/177,285 dated Jul. 22, 2020, 31 pages.

Non-Final Office Action received for U.S. Appl. No. 16/261,547 dated Sep. 3, 2020, 26 pages.

Non-Final Office Action received for U.S. Appl. No. 16/261,548 dated Aug. 21, 2020, 42 pages.

Notice of Allowance received for U.S. Appl. No. 16/261,549 dated Jul. 17, 2020, 40 pages.

Qiang et al., "Dynamics Process of Long-running Allocation/Collection in Linear Storage Space", International Conference on Networking, Architecture, and Storage (NAS 2007), Guilin, 2007, pp. 209-216.

Non-Final Office Action received for U.S. Appl. No. 16/374,725 dated Aug. 19, 2020, 50 pages.

Non-Final Office Action received for U.S. Appl. No. 16/511,161 dated Jul. 10, 2020, 24 pages.

Notice of Allowance received for U.S. Appl. No. 15/862,547 dated Mar. 29, 2019 27 pages.

Non-Final Office Action received for U.S. Appl. No. 15/792,714 dated Apr. 4, 2019, 20 pages.

Final Office Action received for U.S. Appl. No. 15/792,714 dated Sep. 12, 2019, 43 pages.

Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.

Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.

Wikipedia "Front and back ends" URL: https://en.wikipedia.org/wiki/Front_and_back_ends (Year:2019), Sep. 6, 2019, 4 pages.

Notice of Allowance received for U.S. Appl. No. 15/792,714 dated Nov. 8, 2019, 31 pages.

Non-Final Office Action received for U.S. Appl. No. 15/791,390 dated Sep. 20, 2019, 27 pages.

Final Office Action received for U.S. Appl. No. 15/791,390 dated Feb. 6, 2020, 29 pages.

Non-Final Office Action received for U.S. Appl. No. 15/791,390 dated Apr. 30, 2020, 48 pages.

Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.

Non-Final Office Action received for U.S. Appl. No. 16/457,615 dated Jul. 20, 2020, 34 pages.

Office Action received for U.S. Appl. No. 16/177,278, dated Aug. 21, 2020, 53 pages.

Office Action received for U.S. Appl. No. 16/179,486, dated Aug. 13, 2020, 64 pages.

Guo et al., "GeoScale: Providing Geo-Elasticity in Distributed Clouds" 2016 IEEE International Conference on Cloud Engineering, 4 pages.

Guo et al., "Providing Geo-Elasticity in Geographically Distributed Clouds". ACM Transactions on Internet Technology, vol. 18, No. 3, Article 38. Apr. 2018. 27 pages.

Office Action received for U.S. Appl. No. 16/254,073, dated Aug. 18, 2020, 62 pages.

* cited by examiner

DATA CONVOLUTION FOR GEOGRAPHICALLY DIVERSE STORAGE

TECHNICAL FIELD

The disclosed subject matter relates to data convolution, more particularly, to creating convolved data blocks among geographically diverse storage devices.

BACKGROUND

Conventional data storage techniques can employ convolution and deconvolution of data to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage.

DETAILED DESCRIPTION

Figure 1:
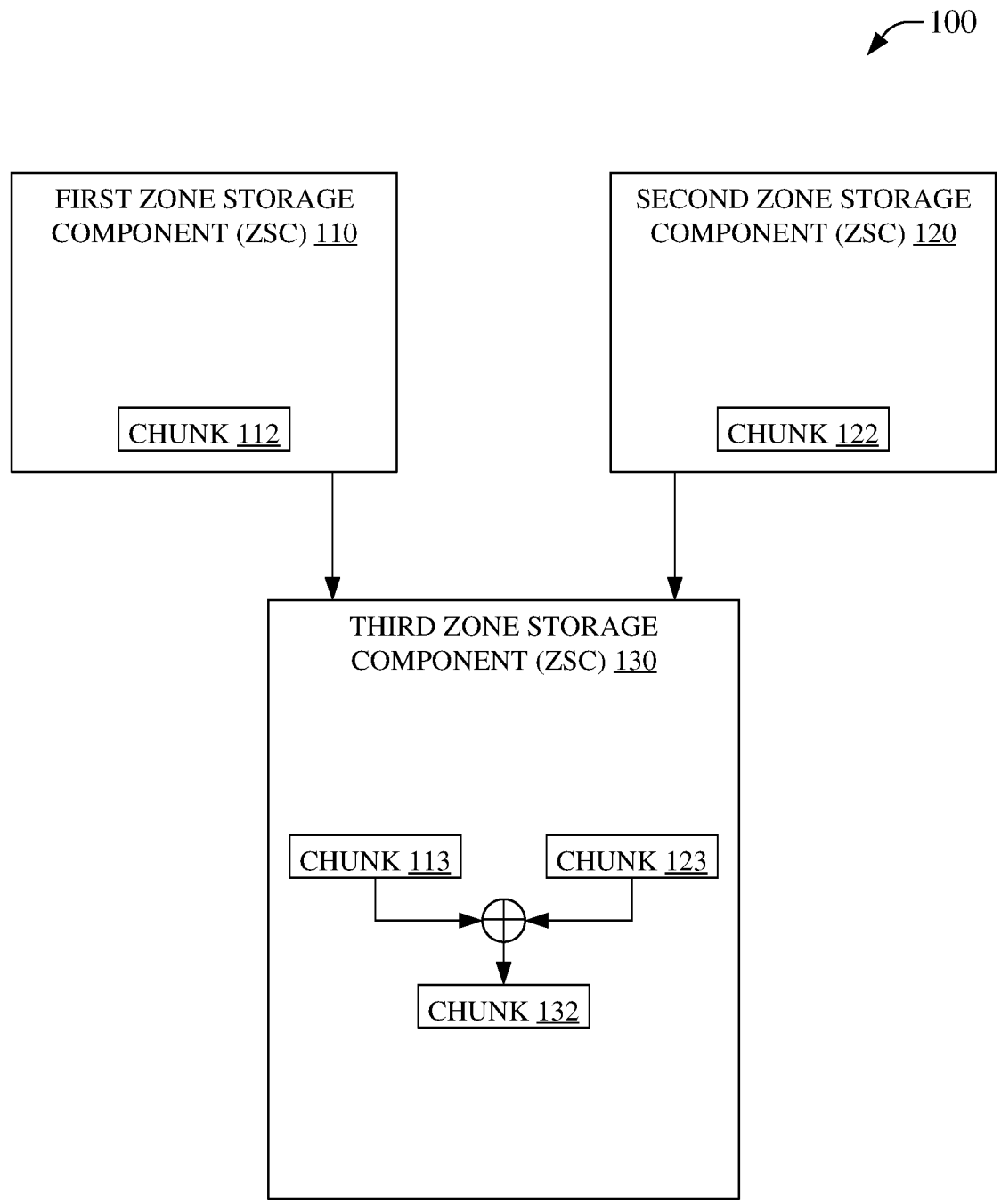
FIG. 1 is an illustration of an example system that can facilitate data convolution for geographically diverse storage, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can employ convolution and deconvolution to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage. Examples of bulk data storage can include networked storage, e.g., cloud storage, for example Elastic Cloud Storage offered by Dell EMC. Bulk storage can, in an aspect, manage disk capacity via partitioning of disk space into blocks of fixed size, frequently referred to as chunks, for example a 128 MB chunk, etc. Chunks can be used to store user data, and the chunks can be shared among the same or different users, for example, one chunk may contain fragments of several user objects. A chunk's content can generally be modified in an append-only mode to prevent overwriting of data already added to the chunk. As such, when a typical chunk becomes full enough, it can be sealed so that the data therein is generally not able for further modification. These chunks can be then stored in a geographically diverse manner to allow for recovery of the data where a first copy of the data is destroyed, e.g., disaster recovery, etc. Blocks of data, hereinafter 'data chunks', or simply 'chunks', can be used to store user data. Chunks can be shared among the same or different users, e.g., a typical chunk can contain fragments of different user data objects. Chunk contents can be modified, for example, in an append-only mode to prevent overwriting of data already added to the chunk, etc. As such, for a typical append-only chunk that is determined to be full, the data therein is generally not able to be further modified. Eventually the chunk can be stored 'off-site', e.g., in a geographically diverse manner, to provide for disaster recovery, etc. Chunks from a data storage device, e.g., 'zone storage component', 'zone storage device', etc., located in a first geographic location, hereinafter a 'zone', etc., can be stored in a second zone storage device that is located at a second geographic location different from the first geographic location. This can enable recovery of data where the first zone storage device is damaged, destroyed, offline, etc., e.g., disaster recovery of data, by accessing the off-site data from the second zone storage device.

Geographically diverse data storage can use data compression to store data. As an example, a storage device in Topeka can store a backup of data from a first zone storage device in Houston, e.g., Topeka can be considered geographically diverse from Houston. As a second example, data chunks from Seattle and San Jose can be stored in Denver. The example Denver storage can be compressed or uncompressed, wherein uncompressed indicates that the Seattle and San Jose chunks are replicated in Denver, and wherein compressed indicates that the Seattle and San Jose chunks are convolved, for example via an 'XOR' operation, into a different chunk to allow recovery of the Seattle or San Jose data from the convolved chunk, but where the convolved chunk typically consumes less storage space than the sum of the storage space for both the Seattle and San Jose chunks individually. In an aspect, compression can comprise convolving data and decompression can comprise deconvolving data, hereinafter the terms compress, compression, convolve, convolving, etc., can be employed interchangeably unless explicitly or implicitly contraindicated, and similarly, decompress, decompression, deconvolve, deconvolving, etc., can be used interchangeably. Compression, therefore, can allow original data to be recovered from a compressed chunk that consumes less storage space than storage of the uncompressed data chunks. This can be beneficial in that data from a location can be backed up by redundant data in another location via a compressed chunk, wherein a redundant data chunk can be smaller than the sum of the data chunks contributing to the compressed chunk. As such, local chunks, e.g., chunks from different zone storage devices, can be compressed via a convolution technique to reduce the amount of storage space used by a compressed chunk at a geographically distinct location.

A convolved chunk stored at a geographically diverse storage device can comprise data from all storage devices of a geographically diverse storage system. As an example, where there are five storage devices, a first storage device can convolve chunks from the other four storage devices to create a 'backup' of the data from the other four storage devices. In this example, the first storage device can create a backup chunk from chunks received from the other four storage devices. In an aspect, this can result in generating copies of the four received chunks at the first storage device and then convolving the four chunks to generate a fifth chunk that is a backup of the other four chunks. Moreover, one or more other copies of the four chunks can be created at the first storage device for redundancy, for example if each chunk has two redundant chunks created, then the four received chunks and their redundant copies results in creating 12 chunks at the first storage device before creating the convolved chunk that is then also redundantly copied resulting in 15 chunk creation events. Further, the 12 redundant copies of the four received chunks is then deleted, e.g., the storage space is released for reuse, the corresponding storage space is overwritten and released, etc., leaving just the convolved chunk and related redundant copies thereof. This can result in high counts of disk read/write events, network traffic within the zone, e.g., where a storage device comprises networked disks, etc., corresponding heat and energy usage, etc. As such, it can be desirable to reduce the use of redundant copies in creation of convolved chunks.

In an embodiment of the disclosed subject matter, a first data chunk and a second data chunk corresponding to a first and second zone that are geographically diverse can be stored in a third data chunk stored at third zone that is geographically diverse from the first and second zones. In an aspect the third chunk can represent the data of the first and second data chunks in a compressed form, e.g., the data of the first data chunk and the second data chunk can be convolved, such as by an XOR function, into the third data chunk. In an aspect, first data of the first data chunk and second data of the second data chunk can be convolved with or without replicating the entire first data chunk and the entire second data chunk at data store(s) of the third zone, e.g., as at least a portion of the first data chunk and at least a portion of the second data chunk are received at the third zone, they can be convolved to form at least a portion of the third data chunk. Where compression occurs without replicating a chunk at another zone prior to compression, this can be termed as 'on-arrival data compression' and can reduce the count of replicate data made at the third zone and data transfers events can correspondingly also be reduced. As an example, chunk 112 and chunk 122 can be on-arrival convolved into chunk 132, e.g., without forming chunk 113 and chunk 123. In some embodiments, replicates of the third data chunk can be stored in the data store(s) of the third zone. As an example, chunk 232 can be replicated in third zone storage component (ZSC) 230 as chunk 234, chunk 236, etc. In an aspect, a ZSC can comprise one or more data storage components that can be communicatively coupled, e.g., a ZSC can comprise one data store, two or more communicatively coupled data stores, etc., such that the replication of data in the ZSC can provide data redundancy in the ZSC, for example, providing protection against loss of one or more data stores of the ZSC. As an example, a ZSC can comprise multiple hard drives and data replicates can be stored on more than one hard drive such that, if a hard drive fails, other hard drives of the ZSC can access a data replicate.

In an embodiment of the disclosed subject matter, a first data chunk and a second data chunk corresponding to a first and second zone that are geographically diverse can be stored in a third data chunk stored at third zone that is geographically diverse from the first and second zones. In an aspect the third chunk can represent the data of the first and second data chunks in a compressed form, e.g., the data of the first data chunk and the second data chunk can be convolved, such as by an XOR function, into the third data chunk. In an aspect, first data of the first data chunk can be replicated in one or more data replicates in the first zone, e.g., chunk 212 can be replicated as chunk 214, chunk 216, etc. In another aspect, second data of the second data chunk can be replicated in one or more data replicates in the second zone, e.g., chunk 222 can be replicated as chunk 224, chunk 226, etc. In a further aspect, first data of the first data chunk and second data of the second data chunk can be convolved with or without replicating the entire first data chunk and the entire second data chunk at data store(s) of the third zone, e.g., as at least a portion of the first data chunk and at least a portion of the second data chunk are received at the third zone, they can be convolved to form at least a portion of the third data chunk. On-arrival data compression can reduce the count of replicate data made at the third zone and data transfers events can correspondingly also be reduced. However, data compression, in some embodiments, can occur after a replica has been formed at the third zone. As an example, chunk 112 and chunk 122 can be replicated as chunk 113 and chunk 123 respectively. In some embodiments, chunks from other zones can be replicated at the third zone, e.g., chunk 213 can be replicated as chunk 215, chunk 217, etc., and/or chunk 223 can be replicated as chunk 225, chunk 227, etc. This can, for example where chunk 213 is stored on third ZSC 230 for some time before chunk 223 is stored on third ZSC 230, provide data redundancy while the chunk is not yet convolved with another chunk. Moreover, in some embodiments, chunks 113 and 123 can be convolved into chunk 132. In some further embodiments, replicates of the third data chunk can be stored in the data store(s) of the third zone. As an example, chunk 232 can be replicated in third ZSC 230 as chunk 234, chunk 236, etc.

In an embodiment of the disclosed subject matter, the count of replicated data can be reduced. In these types of embodiments, a first data chunk and a second data chunk corresponding to a first and second zone that are geographically diverse can be stored in a third data chunk stored at third zone that is geographically diverse from the first and second zones. In an aspect the third chunk can represent the data of the first and second data chunks in a compressed form, e.g., the data of the first data chunk and the second data chunk can be convolved, such as by an XOR function, into the third data chunk. In an aspect, first data of the first data chunk can be replicated in one or more data replicates in the first zone, e.g., chunk 212 can be replicated as chunk 214, chunk 216, etc. In another aspect, second data of the second data chunk can be replicated in one or more data replicates in the second zone, e.g., chunk 222 can be replicated as chunk 224, chunk 226, etc. In a further aspect, first data of the first data chunk and second data of the second data chunk can be convolved after replicating the entire first data chunk at data store(s) of the third zone, e.g., as at least a portion of the second data chunk are received at the third zone, they can be convolved with the replicate of the first data chunk at the third zone to form at least a portion of the third data chunk. These types of embodiments combine compression of z stored replicate of the first data chunk with on-arrival data for the second data chunk, which can reduce the count of replicate data made at the third zone and data transfers events can correspondingly also be reduced. As an example, chunk 112 can be replicated as chunk 113. Subsequently, as at least a portion of data represented by chunk 122 is received at third ZSC 130, this data can be convolved with the data of chunk 113 to result in at least a portion of chunk 132. In some embodiments, chunks from other zones can be replicated at the third zone, e.g., chunk 213 can be replicated as chunk 215, chunk 217, etc. In some further embodiments, replicates of the third data chunk can be stored in the data store(s) of the third zone. As an example, chunk 232 can be replicated in third ZSC 230 as chunk 234, chunk 236, etc.

Compression of chunks can be performed by different compression technologies. Logical operations can be applied to chunk data to allow compressed data to be recoverable, e.g., by reversing the logical operations to revert to the initial chunk data. As an example, data from chunk 1 can undergo an exclusive-or operation, hereinafter 'XOR', with data from chunk 2 to form chunk 3. While other logical and/or mathematical operations can be employed in compression of chunks, those operations are generally beyond the scope of the presently disclosed subject matter and, for clarity and brevity, only the XOR operator will be illustrated herein. However, it is noted that the disclosure is not so limited and that those other operations or combinations of operations can be substituted without departing from the scope of the present disclosure. As such, all logical and/or mathematical operations for compression germane to the disclosed subject matter are to be considered within the scope of the present disclosure even where not explicitly recited for the sake of clarity and brevity.

In an aspect, the presently disclosed subject matter can include 'zones'. A zone can correspond to a geographic location or region. As such, different zones can be associated with different geographic locations or regions. As an example, Zone A can comprise Seattle, Wash., Zone B can comprise Dallas, Tex., and, Zone C can comprise Boston, Mass. In this example, where a local chunk from Zone A is replicated, e.g., compressed or uncompressed, in Zone C, an earthquake in Seattle can be less likely to damage the replicated data in Boston. Moreover, a local chunk from Dallas can be convolved with the local Seattle chunk, which can result in a compressed/convolved chunk, e.g., a partial or complete chunk, which can be stored in Boston. As such, either the local chunk from Seattle or Dallas can be used to de-convolve the partial/complete chunk stored in Boston to recover the full set of both the Seattle and Dallas local data chunks. The convolved Boston chunk can consume less disk space than the sum of the Seattle and Dallas local chunks. An example technique can be "exclusive or" convolution, hereinafter 'XOR', '⊕', etc., where the data in the Seattle and Dallas local chunks can be convolved by XOR processes to form the Boston chunk, e.g., $C=A1\oplus B1$, where A1 is a replica of the Seattle local chunk, B1 is a replica of the Dallas local chunk, and C is the convolution of A1 and B1. Of further note, the disclosed subject matter can further be employed in more or fewer zones, in zones that are the same or different than other zones, in zones that are more or less geographically diverse, etc. As an example, the disclosed subject matter can be applied to data of a single disk, memory, drive, data storage device, etc., without departing from the scope of the disclosure, e.g., the zones represent different logical areas of the single disk, memory, drive, data storage device, etc. Moreover, it will be noted that convolved chunks can be further convolved with other data, e.g., $D=C1\oplus E1$, etc., where E1 is a replica of, for example, a Miami local chunk, E, C1 is a replica of the Boston partial chunk, C, from the previous example and D is an XOR of C1 and E1 located, for example, in Fargo.

In an aspect, XORs of data chunks in disparate geographic locations can provide for de-convolution of the XOR data chunk to regenerate the input data chunk data. Continuing a previous example, the Fargo chunk, D, can be de-convolved into C1 and E1 based on either C1 or E1; the Miami chunk, C, can be de-convolved into A1 or B1 based on either A1 or B1; etc. Where convolving data into C or D comprises deletion of the replicas that were convolved, e.g., A1 and B1, or C1 and E1, respectively, to avoid storing both the input replicas and the convolved chunk, de-convolution can rely on retransmitting a replica chunk that so that it can be employed in de-convoluting the convolved chunk. As an example the Seattle chunk and Dallas chunk can be replicated in the Boston zone, e.g., as A1 and B1. The replicas, A1 and B1 can then be convolved into C. Replicas A1 and B1 can then be deleted because their information is redundantly embodied in C, albeit convolved, e.g., via an XOR process, etc. This leaves only chunk C at Boston as the backup to Seattle and Dallas. If either Seattle or Dallas is to be recovered, the corollary input data chunk can be used to de-convolve C. As an example, where the Seattle chunk, A, is corrupted, the data can be recovered from C by de-convolving C with a replica of the Dallas chunk B. As such, B can be replicated by copying B from Dallas to Boston as B1, then de-convolving C with B1 to recover A1, which can then be copied back to Seattle to replace corrupted chunk A.

In some circumstances, disk space management can seek to recover underutilized disk space. As an example, where the Seattle chunk, A, is to be deleted, recovery of the Dallas chunk, B, via Boston convolved chunk, C, becomes dependent on having a copy of B to de-convolve C with after A has been deleted. As such, it can be desirable to de-convolve C into A1 and B1 prior to deleting A and A1, such that B1 can be convolved with another chunk, for example Miami chunk, E. As such, recovery of B1 can be based on E1 and the XOR of B1E1. Also of note, to de-convolve C in to A1 and B1, a replica of A, e.g., A1 is made in Boston, this allows recovery of B1. Once B1 is recovered, C, A1, and A can be deleted. Then B1 can be convolved with E1. It will be noted that data is transferred, e.g., A is copied into A1 from Seattle to Boston, to allow C to be de-convolved.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate data convolution for geographically diverse storage, in accordance with aspects of the subject disclosure. System 100 can comprise three or more zone storage components (ZSCs), e.g., first ZSC 110, second ZSC 120, third ZSC 130, etc. The ZSCs can communicate with the other ZSCs of system 100. A zone can correspond to a geographic location or region. As such, different zones can be associated with different geographic locations or regions. A ZSC can comprise one or more data stores in one or more locations. In an aspect, a ZSC can store at least part of a data chunk on at least part of one data storage device, e.g., hard drive, flash memory, optical disk, cloud storage, etc. Moreover, a ZSC can store at least part of one or more data chunks on one or more data storage devices, e.g., on one or more hard disks, across one or more hard disks, etc. As an example, a ZSC can comprise one or more data storage devices in one or more data storage centers corresponding to a zone, such as a first hard drive in a first location proximate to Miami, a second hard drive also proximate to Miami, a third hard drive proximate to Orlando, etc., where the related portions of the first, second, and third hard drives correspond to, for example, a 'Miami zone'.

In an aspect, data chunks can be replicated in their source zone, in a geographically diverse zone, in their source zone and one or more geographically diverse zones, etc. As an example, a Seattle zone can comprise a first chunk that can be replicated in the Seattle zone to provide data redundancy in the Seattle zone, e.g., the first chunk can have one or more replicated chunks in the Seattle zone, such as on different storage devices corresponding to the Seattle zone, thereby providing data redundancy that can protect the data of the first chunk, for example, where a storage device storing the first chunk or a replicate thereof becomes compromised, the other replicates (or the first chunk itself) can remain uncompromised. As an example, chunk 212 in FIG. 2 can be replicated in first ZSC 210 as chunks 214, 216, etc. In an aspect, data replication in a zone can be on one or more storage devices, e.g., chunk 212 can be stored on a first data storage device, chunk 214 can be stored on a second storage device, and chunk 216 can be stored on a third storage device, wherein the first, second, and third storage devices correspond to the first zone, and wherein the first, second, and third storage devices can be the same storage device or different storage devices. Replication of chunks, e.g., chunk 212 into chunks 214, 216, etc., can comprise communicating data, e.g., over a network, bus, etc., to other data storage locations on the first, second, and third storage devices and, moreover, can consume data storage resources, e.g., drive space, etc., upon replication. As such, the number of replicates can be based on balancing resource costs, e.g., network traffic, processing time, cost of storage space, etc., against a level of data redundancy, e.g., how much redundancy is needed to provide a level of confidence that the data/replicated data will be available within a zone.

A geographically diverse storage system, e.g., a system comprising system 100, can create a replicate of a first chunk, e.g., chunk 112, at a geographically diverse ZSC, for example, chunk 113 at third ZSC 130, etc. The replicate at the geographically diverse ZSC can provide data redundancy at a different level than the level associated with replicates within a single ZSC. As an example, where first ZSC 110 is affiliated with a Seattle zone, and third ZSC 130 is affiliated with a Boston zone, then a regional event that compromises chunk 112 in the Seattle zone can be less likely to also compromise chunk 113 in the Boston zone.

In an aspect, replication of chunks between different zones of system 100 can consume data storage resources, e.g., network traffic, data storage space, processor time, energy, manpower, etc. As an example, replication of chunk 112 and chunk 122 at third ZSC 130, e.g., as chunk 113 and chunk 123 respectively, can consume processing cycles at each of the first to third ZSCs 110, 120, and 130, can consume network resources to communicate the data between the first to third ZSCs 110, 120, and 130, can consume data storage space/resources at each of the first to third ZSCs 110, 120, and 130, etc. Moreover, where, as illustrated, a ZSC, e.g., ZSC 130, stores replicates of chunks from other zones, e.g., ZSCs 110 and 120, the replicated chunks, e.g., chunk 113 and chunk 123, can occupy a first amount of storage space, e.g., chunks 113 and 123 consume a first amount of storage space on storage device(s) of third ZSC 130. Compression of the redundant data can reduce the amount of consumed storage space while preserving the redundancy of the data. As an example, chunk 113 and chunk 123 can be compressed into chunk 132 that can consume less data storage space than the space associated with separately storing each of chunk 113 and chunk 123. In an embodiment, compression can be via an XOR operation of chunk 113 and chunk 123, e.g., 'chunk 132=chunk 113 XOR chunk 123,' etc. Thereafter, in some embodiments, chunks 113 and 123 can be deleted, e.g., the space used by chunks 113 and 123 can be freed, released, reclaimed, etc., for other uses.

Figure 2:
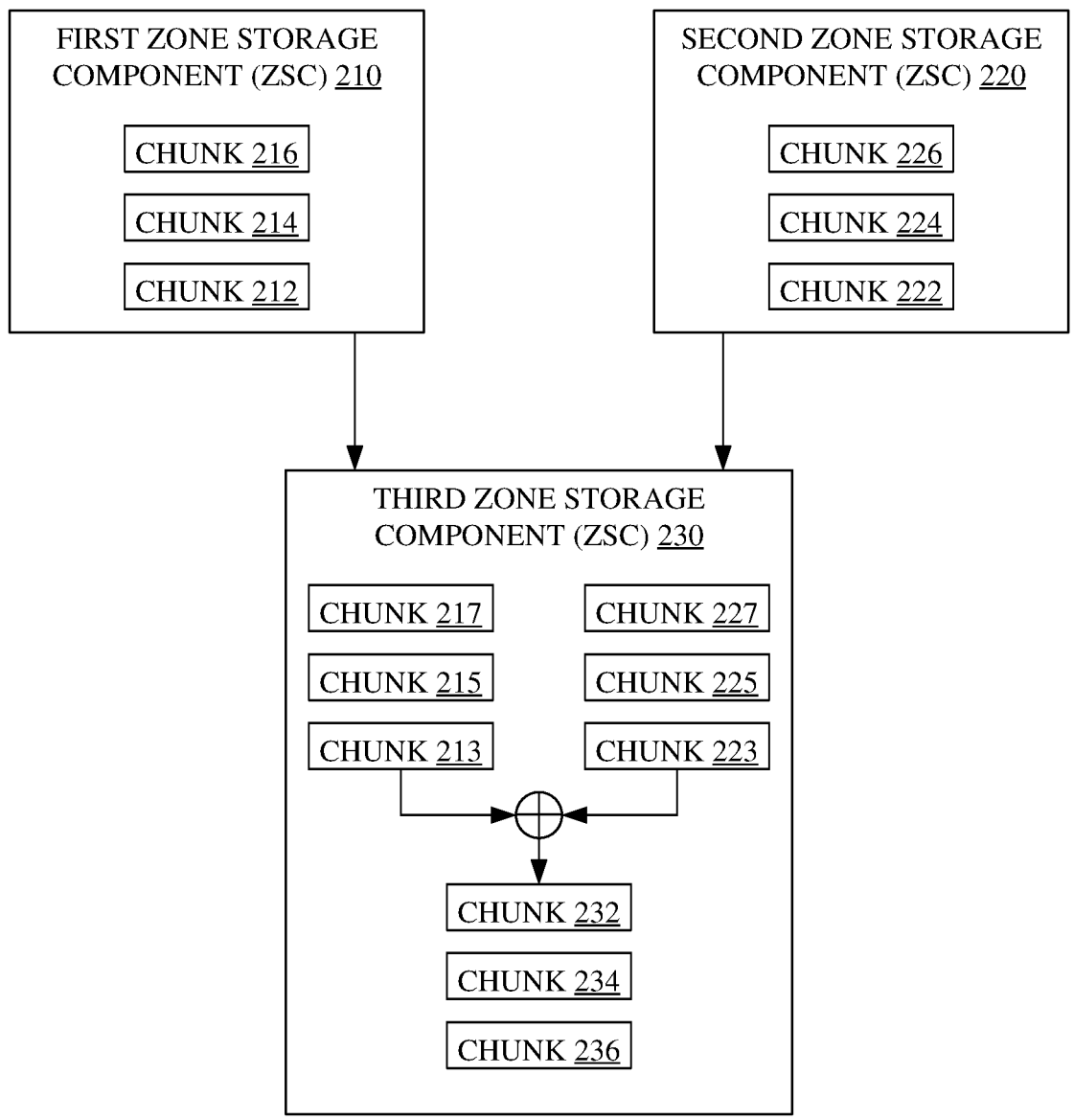
FIG. 2 is an illustration of an example system that can facilitate data convolution for geographically diverse storage with pre-convolution data replication and post-convolution data replication, in accordance with aspects of the subject disclosure.

FIG. 2 is an illustration of a system 200, which can enable data convolution for geographically diverse storage with pre-convolution data replication and post-convolution data replication, in accordance with aspects of the subject disclosure. System 200 can be considered a more robust example of system 100, where system 100 illustrates a rudimentary geographically diverse storage system employing data convolution. System 200, in an embodiment, can operate similar to system 100 but can further provide for local replication of data. As an example, chunk 212 can be locally replicated as chunk 214, chunk 216, etc., e.g., chunk 212 can be replicated within a first zone, for example by replication at first ZSC 210. Similarly, chunk 222 can be locally replicated as chunk 224, chunk 226, etc., at second ZSC 220.

In system 200, data replicated from a first zone to another zone can also under replication at the other zone. It can be observed that chunk 212 and/or chunk 222 can be replicated at a geographically diverse zone, e.g., via third ZSC 230, as chunk 213 and/or chunk 223 respectively. The replicated chunks, e.g., chunks 213, 223, etc., can further be locally replicated at the geographically diverse zone, e.g., chunk 213 can be replicated at third ZSC 230 as chunk 215, chunk 217, etc., and/or chunk 223 can be replicated at third ZSC 230 as chunk 225, chunk 227, etc.

In an embodiment, third ZSC 230 can compress chunks from other zones, e.g., chunk 213 and chunk 223 can be compressed into chunk 232 that can consume less data storage space than the space associated with separately storing each of chunk 213 and chunk 223. Chunks 213 and 223 can be deleted where their data is represented in chunk 232. Moreover, third ZSC 230 can then provide local data redundancy by replicating the compressed chunk, e.g., chunk 232 can be replicated locally in the third zone, e.g., via third ZSC 230, as chunk 234, chunk 236, etc.

It can be observed that system 200 provides a higher level of data redundancy than, for example, system 100 by providing local replicates of data chunks, e.g., chunk 212 can be replicated in first ZSC 210 as chunks 214, 216, etc., chunk 222 can be replicated in second ZSC 220 as chunks 224, 226, etc., chunk 213 (which can be a replicate of chunk 212) can be replicated in third ZSC 230 as chunks 215, 217, etc., chunk 223 (which can be a replicate of chunk 222) can be replicated in third ZSC 230 as chunks 225, 227, etc., and/or chunk 232 (which can be a convolution of chunk 213 and chunk 223) can be replicated in third ZSC 230 as chunks 234, 236, etc. In an aspect, the higher level of data redundancy is commensurate with greater consumption of resources, e.g., increased network/bus traffic, consumed storage space, energy used, etc.

Figure 3:
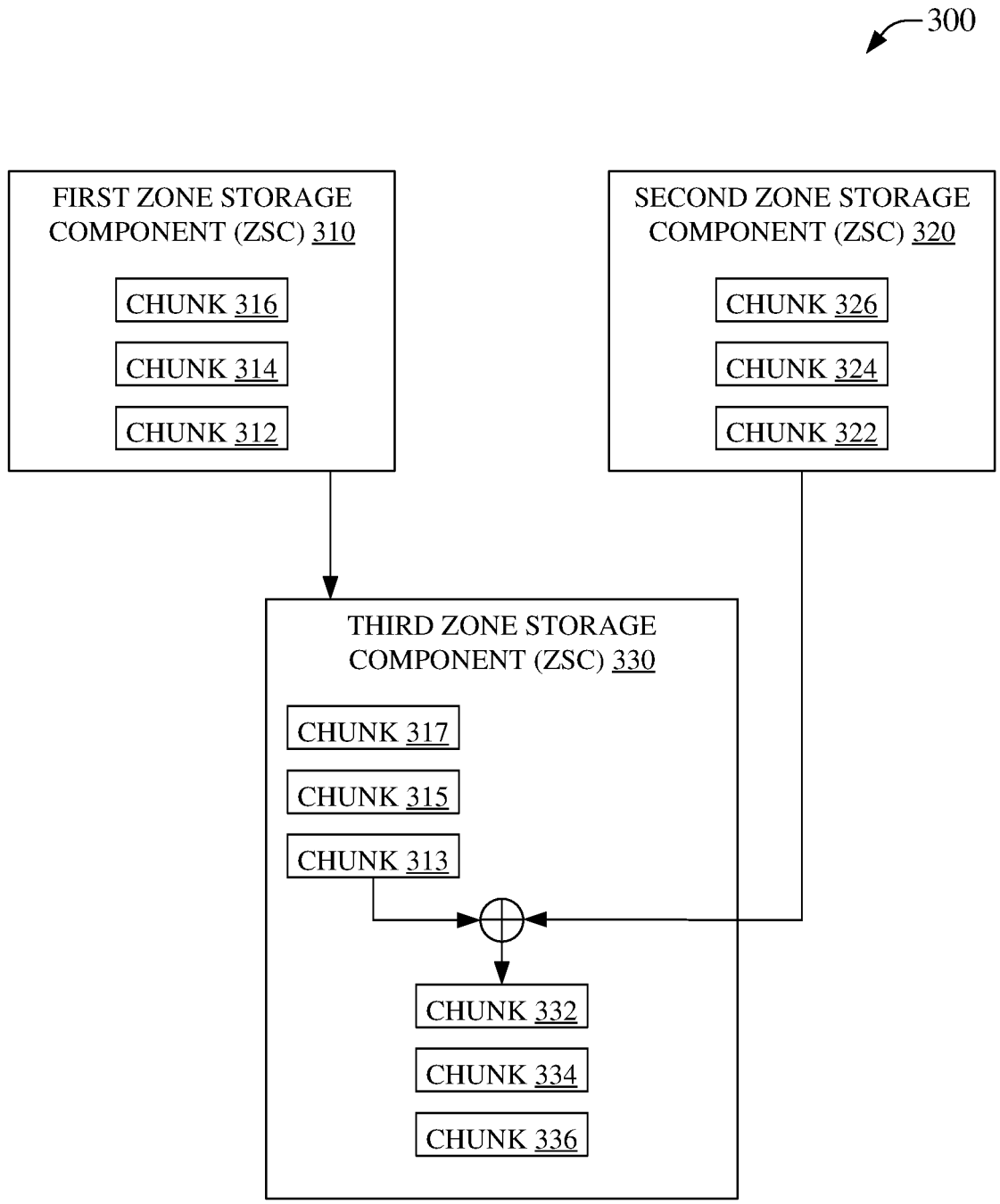
FIG. 3 is an illustration of an example system that can enable data convolution for geographically diverse storage with reduced pre-convolution data replication, on-arrival data, and post-convolution data replication, in accordance with aspects of the subject disclosure.

FIG. 3 is an illustration of a system 300, which can facilitate data convolution for geographically diverse storage with reduced pre-convolution data replication, on-arrival data, and post-convolution data replication, in accordance with aspects of the subject disclosure. Similar to system 200, system 300 can be considered a more robust example of system 100. System 300, in an embodiment, can operate similar to system 100 but can provide for some level of local replication of data. As an example, chunk 312 can be locally replicated as chunk 314, chunk 316, etc., e.g., chunk 312 can be replicated within a first zone, for example by replication at first ZSC 310. Similarly, chunk 322 can be locally replicated as chunk 324, chunk 326, etc., at second ZSC 320.

In system 300, data replicated from a first zone to another zone can also undergo replication at the other zone. It can be observed that chunk 312 can be replicated at a geographically diverse zone, e.g., via third ZSC 330, as chunk 313. In contrast to system 200, however, the local replication can be reduced by compressing chunk 313 with data from chunk 322 without needing to create a local copy of all of chunk 322 and/or not creating replicates of chunk 322 at third ZSC 330. As such, chunks 313 can be created at third ZSC 330 and can then wait to be compressed with data from another incoming chunk, e.g., data from chunk 322, on arrival. Further chunk 313 can be locally replicated at third ZSC 330 as chunk 315, chunk 317, etc., to provide some level of data redundancy at third ZSC 330, such as where there is a delay between arrival of data from chunk 312 being written into chunk 313 and arrival of data from chunk 322.

In an embodiment, third ZSC 330 can compress chunks from other zones, e.g., chunk 313 and data from chunk 322 can be compressed into chunk 332 that can consume less data storage space than the space associated with separately storing each of chunk 313 and data from chunk 322 in a manner similar to storing data from chunk 222 into chunk 223 in system 200. Chunk 313 can later be deleted where their data is represented in chunk 332. Moreover, third ZSC 330 can then provide local data redundancy by replicating the compressed chunk, e.g., chunk 332 can be replicated locally in the third zone, e.g., via third ZSC 330, as chunk 334, chunk 336, etc.

It can be observed that system 300 can provide a lower level of data redundancy than system 200 but a higher level of data redundancy than system 100 by providing only some local replicates of data chunks, e.g., chunk 312 can be replicated in first ZSC 310 as chunks 314, 316, etc., chunk 322 can be replicated in second ZSC 320 as chunks 324, 326, etc., chunk 313 (which can be a replicate of chunk 312) can be replicated in third ZSC 330 as chunks 315, 317, etc., and/or chunk 332 (which can be a convolution of chunk 313 and data from chunk 322) can be replicated in third ZSC 330 as chunks 334, 336, etc. In an aspect, this more moderate level of data redundancy can consume fewer resources than system 200 but more than system 100, e.g., resource consumption of storage space and network/bus traffic to create a local copy of chunk 322 at third ZSC 320 is removed in comparison to system 200 creating a local copy of chunk 222 as chunk 223, and replicate chunks 225, 227, etc., at third ZSC 230.

Figure 4:
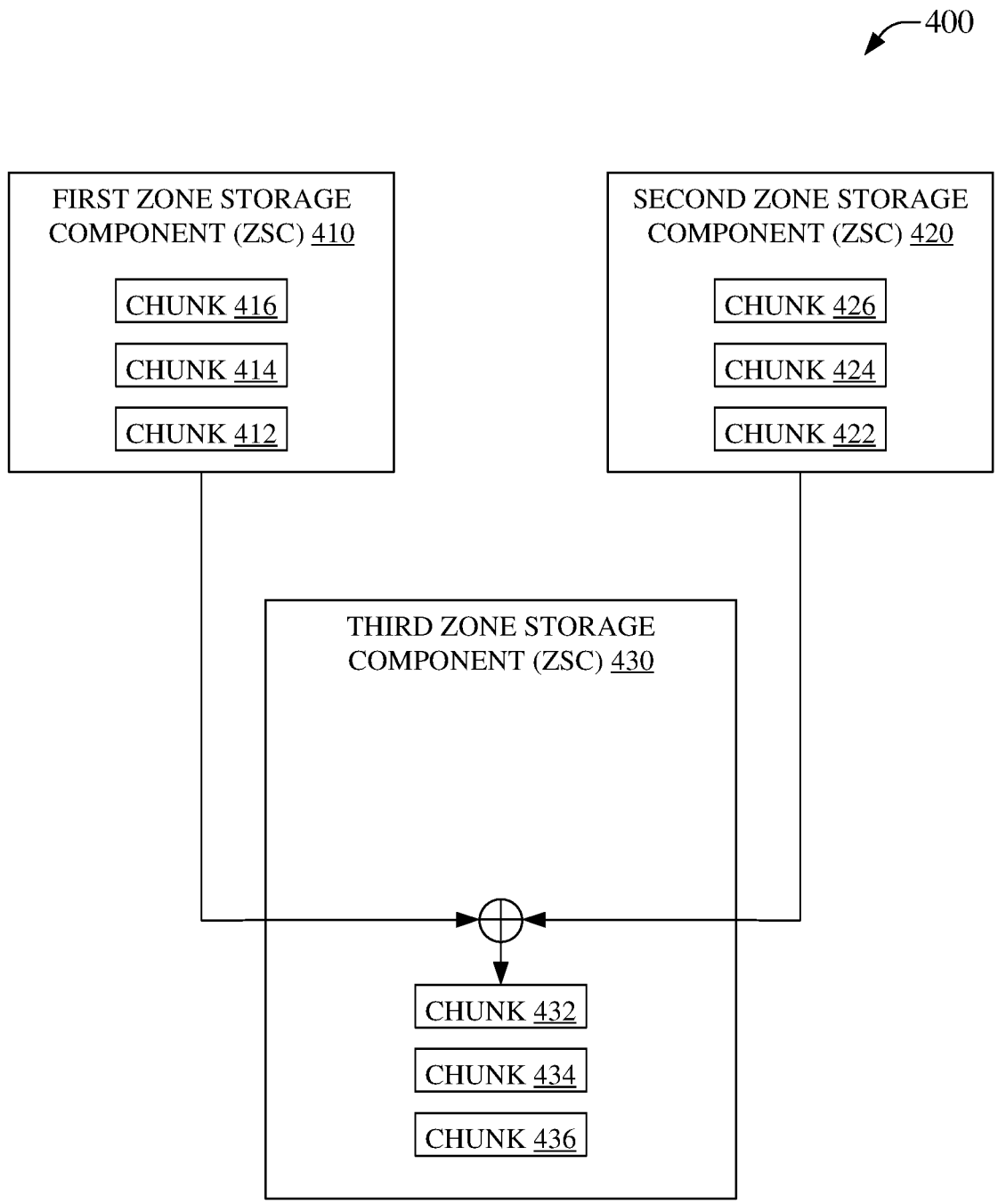
FIG. 4 illustrates an example system that can facilitate data convolution for geographically diverse storage employing on arrival data and post-convolution data replication, in accordance with aspects of the subject disclosure.

FIG. 4 is an illustration of a system 400, which can enable data convolution for geographically diverse storage employing on arrival data and post-convolution data replication, in accordance with aspects of the subject disclosure. System 400 can again be similar to system 200 and system 300 as perhaps being considered a more robust example of system 100. System 400, in an embodiment, can operate similar to system 100 but can provide for some level of local replication of data. As an example, chunk 412 can be locally replicated as chunk 414, chunk 416, etc., e.g., chunk 412 can be replicated within a first zone, for example by replication at first ZSC 410. Similarly, chunk 422 can be locally replicated as chunk 424, chunk 426, etc., at second ZSC 420.

In system 400, data communicated from a first zone and a second zone to third zone can be employed, on arrival, for compression into a chunk on the third zone without needing to create local replicates of chunks, e.g., associated with the communicated data, at the third zone. It can further be observed that where chunks from other zones are not replicated at the third zone, creation of local replicates of these absent chunks is also not necessary. As an example, system 400 can differ from system 300 in that where chunk 313, a replicate of chunk 312, is not created at ZSC 330, there is no need to create chunks 315, 317, etc. This can be similar to receiving data from chunk 322 for on-arrival compression into chunk 332 except that data from chunk 312 is similarly employed for on-arrival compression, e.g., data from chunks 412 and 422 are both employed in on-arrival compression into chunk 432, thereby avoiding creation of several local chunks and correspondingly further reducing the consumption of resources. In an aspect, on-arrival compression can employ temporary storage, buffers, etc., but can generally avoid writing a replicate chunk from incoming data prior to creation of a compressed chunk based on two or more incoming chunks from other geographically diverse storage zones.

In an embodiment, third ZSC 430 can compress data from chunks from other zones, e.g., data from chunk 413 and data from chunk 422 can be on-arrival compressed into chunk 432 that can consume less data storage space than the space associated with separately storing data from each of chunk 412 and chunk 422 as local replicates, e.g., in a manner similar to storing data from chunk 222 into chunk 223 in system 200, storing data from chunk 312 into chunk 313 in system 300, etc. Moreover, third ZSC 430 can then provide local data redundancy by replicating the compressed chunk, e.g., chunk 432 can be replicated locally in the third zone, e.g., via third ZSC 430, as chunk 434, chunk 436, etc.

It can be observed that system 400 can provide a lower level of data redundancy than systems 200 or 300, but a higher level of data redundancy than system 100 by providing only some local replicates of data chunks, e.g., chunk 412 can be replicated in first ZSC 410 as chunks 414, 416, etc., chunk 422 can be replicated in second ZSC 420 as chunks 424, 426, etc., and/or chunk 432 (which can be a convolution of data from chunk 413 and data from chunk 422) can be replicated in third ZSC 430 as chunks 434, 436, etc. In an aspect, this more streamlined moderate level of data redundancy can consume fewer resources than systems 200 or 300, but more than system 100, e.g., resource consumption of storage space and network/bus traffic to create a local copy of chunk 422 at third ZSC 420 is removed in comparison to system 200 creating a local copy of chunk 222 as chunk 223, and replicate chunks 225, 227, etc., at third ZSC 230. It will be noted that, in comparison to system 400, system 200 comprises consumption of resources corresponding to creating, employing, and deleting six additional chunk replicates, e.g., system 400 lacks replicates corresponding to chunks 213, 215, 217, 223, 225, and 227, of system 200, while data transfer between zones, e.g., ZSCs 410, 420, and 430 remain similar to system 200. In an aspect, inter-zone data transfer can be the same, e.g., the same data is transferred between ZSCs 410/420 a ZSC 430 as would be transferred between ZSCs 210/220 and ZSC 230. However, in some embodiments, the data transfer in system 400 can be similar, if not the same, e.g., the data transferred in system 400 can include data such as error correcting codes, checksums, resending portions of the data, etc., that can be helpful in ensuring that all of the data from the originating chunks is properly received for compression in third ZSC 430, and this data can be different from, or absent in, the corresponding data transfers in system 200.

Figure 5:
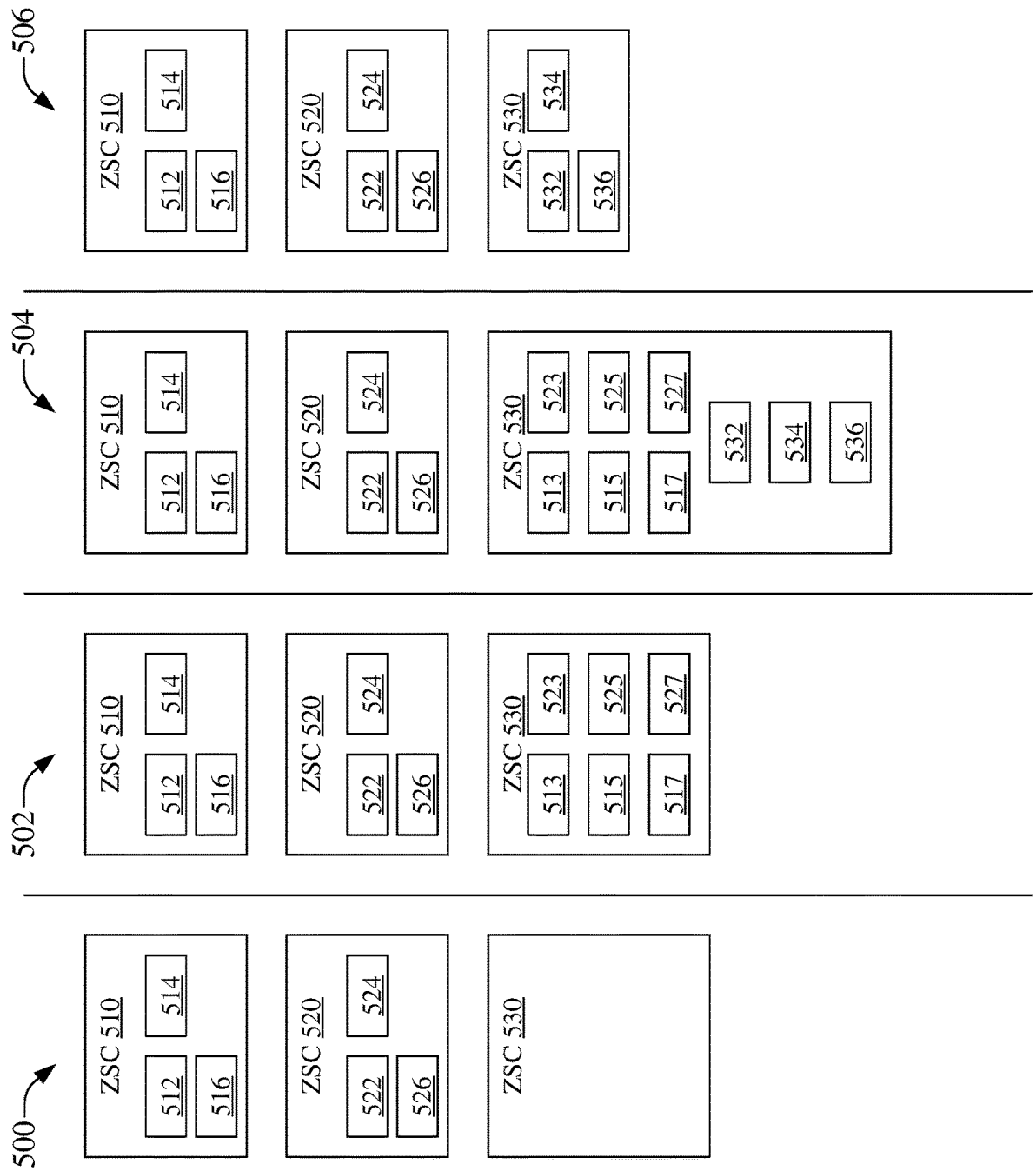
FIG. 5 is an illustration of example system states for data convolution for geographically diverse storage with pre-convolution data replication, in accordance with aspects of the subject disclosure.

FIG. 5 is an illustration of example system states, 500-506, for data convolution in geographically diverse storage systems with pre-convolution data replication, in accordance with aspects of the subject disclosure. Example first state 500 illustrates ZSC 510 comprising data chunks 512-516 and ZSC 520 can comprise data chunks 522-526. In an aspect, data chunks 514, 516, etc., can be local replicates of data chunk 512, and data chunks 524, 526, etc., can be local replicates of data chunk 522. ZSC 530 is illustrated as empty for simplicity and to aid in understanding of the disclosed subject matter. It is to be noted that ZSC 530 can, in fact, comprise stored chunks without departing from the scope of the instant disclosure, but any such chunks are generally not related to the disclosed subject matter and are therefore omitted to avoid introducing confusion.

At example system state 502, at least a portion of data from one or more of ZSC 510, 520, etc., can be received at ZSC 530 and employed in creating a chunk at ZSC 530. In an embodiment, as illustrated, chunk 512 can be replicated as chunk 513, chunk 522 can be replicated as chunk 523, etc., as enabled by receiving at least a portion of the data comprising chunk 512 and 513, respectively, at ZSC 530. Moreover, ZSC 530 can then replicate the local chunks to provide greater data redundancy, as disclosed herein above, e.g., chunk 513 (which can be a replicate of chunk 512) can be replicated at ZSC 530 as chunk 515, 517, etc., and/or chunk 523 (which can be a replicate of chunk 522) can be replicated at ZSC 530 as chunk 525, 527, etc. It will be noted that increasing data redundancy has resulted in the creation of 10 chunks, e.g., 514, 516, 524, 526, 513, 515, 517, 523, 525, and 527, which each replicate either chunk 512 or chunk 522, as has been noted.

At example system state 504, a replicate of chunk 512 and a replicate of chunk 522 can be compressed at ZSC 530 to form a chunk, e.g., chunk 532, comprising a representation of the data stored in chunk 512 and chunk 522 using less data storage space than preserving a single replicate of both chunk 512 and chunk 522. It will further be noted that the replicate of chunk 512, e.g., chunk 513, and the replicate of chunk 522, e.g., 523, are still stored at example system state 504, and that additionally, replicates of the replicate, e.g., 515, 517, etc., as replicates of chunk 513, and 525, 527, etc., as replicates of chunk 523, are still also stored at ZSC 530 in example system state 504. Moreover, chunk 532 itself can be replicated in ZSC 530 to provide additional data redundancy, e.g., as chunk 534, 536, etc.

Example system state 506 can comprise deleting some replicates to reduce data redundancy to a determined level, e.g., as may be indicated by a user, controlled by a rule, set as a default level of data redundancy, etc. Illustrated in example system state 506, chunks 513, 515, 517, 523, 525, and 527 can be deleted, e.g., the memory can be released, freed, etc., allowing other use of the corresponding storage space. In example system state 506, the data comprised in chunk 512 is redundantly stored in chunks 514, 516, 532, 534, and 536, albeit that in chunks 532, 534, and 536, the data is compressed/convolved with data comprised in chunk 522. Similarly, the data comprised in chunk 522 is redundantly stored in chunks 524, 526, 532, 534, and 536, albeit that in chunks 532, 534, and 536, the data is compressed/convolved with data comprised in chunk 512. As such, compromising any one of ZSC 510, 520, or 530, will not result in loss of the data comprised chunk 512 or chunk 522. Further, compromising a portion of a data store where any one of chunk 512, 514, 516, etc., is stored will not result in loss of data originally comprised in chunk 512; compromising a portion of a data store where any one of chunk 522, 524, 526, etc., is stored will not result in loss of data originally comprised in chunk 522; compromising a portion of a data store where any one of chunk 532, 534, 536, etc., is stored will not result in loss of data originally comprised in either chunk 512 or chunk 522. It will be noted that the number of events occurring to move data, create replicates, convolve data, create further replicates, and free excessively redundant data storage space can be resource intensive in comparison to on-arrival type compression of data in a geographically diverse storage system, but example system states 500-506 can be considered as highly effective at providing a high level of data redundancy.

Figure 6:
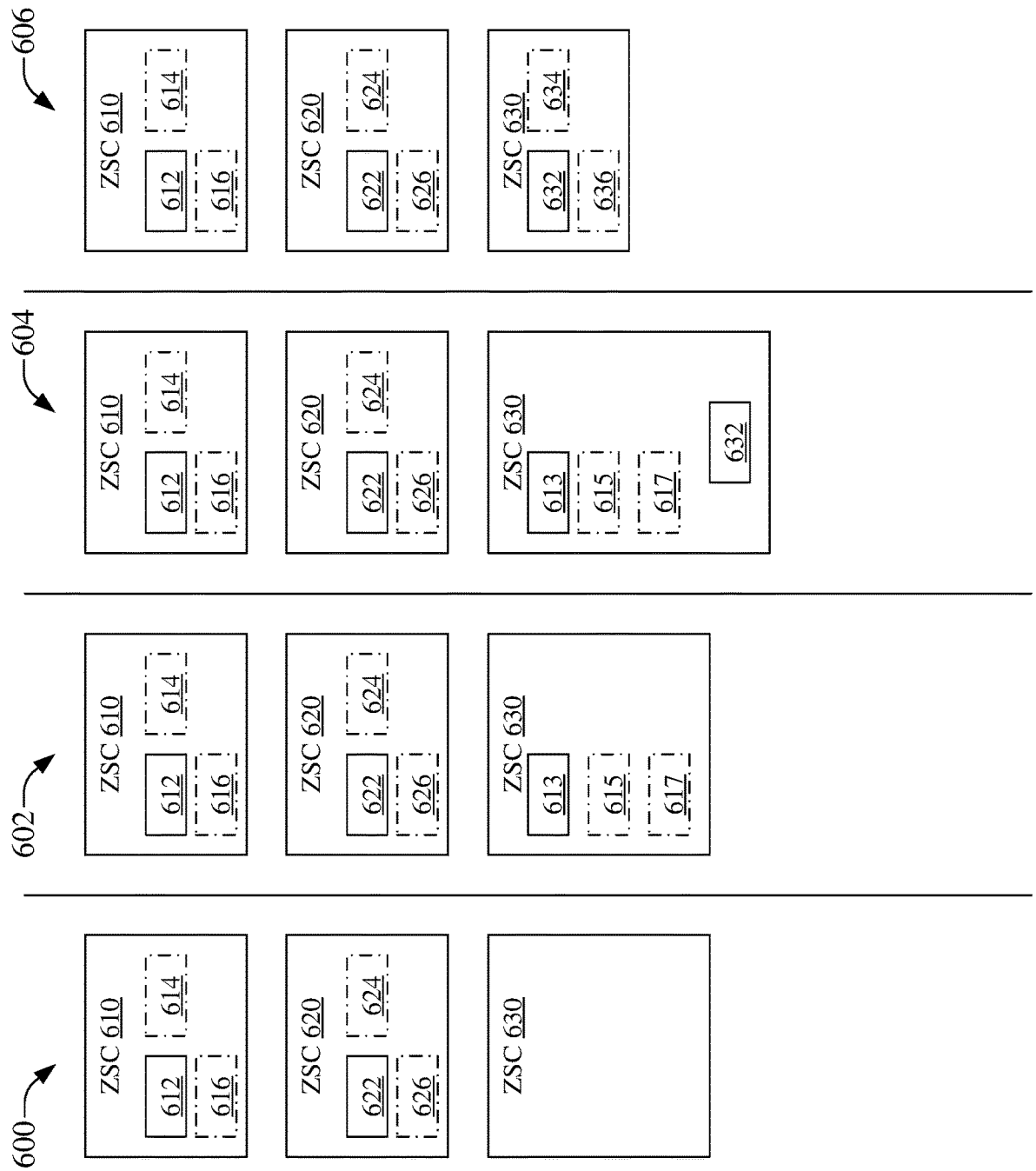
FIG. 6 is an illustration of example system states for data convolution for geographically diverse storage with on-arrival data and optional reduced pre-convolution data replication, in accordance with aspects of the subject disclosure.

FIG. 6 is an illustration of example system states, 600-606, for data convolution for geographically diverse storage with on-arrival data and optional reduced pre-convolution data replication, in accordance with aspects of the subject disclosure. Example first state 600 illustrates ZSC 610 comprising data chunk 612, and optionally 614-616 where further data redundancy is determined to be appropriate. Example first state 600 further illustrates that ZSC 620 can comprise data chunk 622, and optionally 624-626, where determined to be appropriate. In an aspect, data chunks 614, 616, etc., can be local replicates of data chunk 612, and data chunks 624, 626, etc., can be local replicates of data chunk 622. ZSC 630 is illustrated as empty even where ZSC 630 can, in fact, comprise stored chunks without departing from the scope of the instant disclosure, but any such chunks are generally not related to the disclosed subject matter and are therefore omitted for clarity and brevity.

At example system state 602, at least a portion of data from one or more of ZSC 610, 620, etc., can be received at ZSC 630 and employed in creating a chunk at ZSC 630. In an embodiment, as illustrated, chunk 612 can be replicated as chunk 613, based on receiving at least a portion of the data comprising chunk 612 at ZSC 630. Moreover, ZSC 630 can then optionally replicate the local chunks to provide greater data redundancy, e.g., chunk 613 (which can be a replicate of chunk 612) can be replicated at ZSC 630 as chunk 615, 617, etc.

At example system state 604, chunk 613 and data comprised in chunk 622 can be on-arrival compressed at ZSC 630 to form chunk 632, e.g., as data comprised in chunk 622 is received at ZSC 630, the data can be compressed with the data from chunk 613, which itself is a replicate of the data comprised in chunk 612, to form chunk 632 at ZSC 630. As such, chunk 632 can be a representation of the data stored in chunk 612 and chunk 622 while using less data storage space than preserving a single replicate of both chunk 612 and chunk 622. It will further be noted that the replicate of chunk 612, e.g., chunk 613, is still stored at example system state 604, and that additionally, replicates of the replicate, e.g., 616, 617, etc., as replicates of chunk 613, can optionally still also be stored at ZSC 630 in example system state 604. Moreover, chunk 632 can be optionally replicated in ZSC 630 to provide additional data redundancy, but this aspect is not illustrated for clarity and brevity.

In an embodiment similar to system 400, though not illustrated for brevity, data comprised in chunk 612 can also be compressed on-arrival. In this embodiment, data comprised in chunk 612 and data comprised in chunk 622 can be compressed on-arrival at ZSC 630 to result in at least a portion of chunk 632. In this embodiment, chunk 613 and optional chunks 615, 617, etc., would not be stored at ZSC 630.

Example system state 606 illustrates that some replicates can be deleted to reduce data redundancy to a determined level, e.g., chunk 613 and optional chunks 615, 617 can be deleted, e.g., the memory can be released, freed, etc., allowing other use of the corresponding storage space. In example system state 606, the data comprised in chunk 612 can be redundantly stored in optional chunks 614, 616, and in compressed form in chunk 632, and in optional chunks 634-636. Similarly, the data comprised in chunk 622 can be redundantly stored in optional chunks 624, 626, and in compressed form in 632, and in optional chunks 634-636. As such, compromising any one of ZSC 610, 620, or 630, will not result in loss of the data comprised chunk 612 or chunk 622. Further, compromising a portion of a data store where any one of chunk 612 and optional chunks 614, 616, etc., are stored will not result in loss of data originally comprised in chunk 612; compromising a portion of a data store where any one of chunk 622 and optional chunks 624, 626, etc., are stored will not result in loss of data originally comprised in chunk 622; and compromising a portion of a data store where any one of chunk 632 and optional chunks 634, 636, etc., are stored will not result in loss of data originally comprised in either chunk 612 or chunk 622. It will be noted that the number of events occurring to move data, create replicates, convolve data, create further replicates, and free excessively redundant data storage space can be less resource intensive than illustrated in states 500-506, e.g., where states 600-606 employ partial on-arrival type compression of data in a geographically diverse storage system it can consume fewer resources than arriving at a comparable state in states 500-506, but example system states 600-606 can have a lower level of data redundancy that states 500-506.

Figure 7:
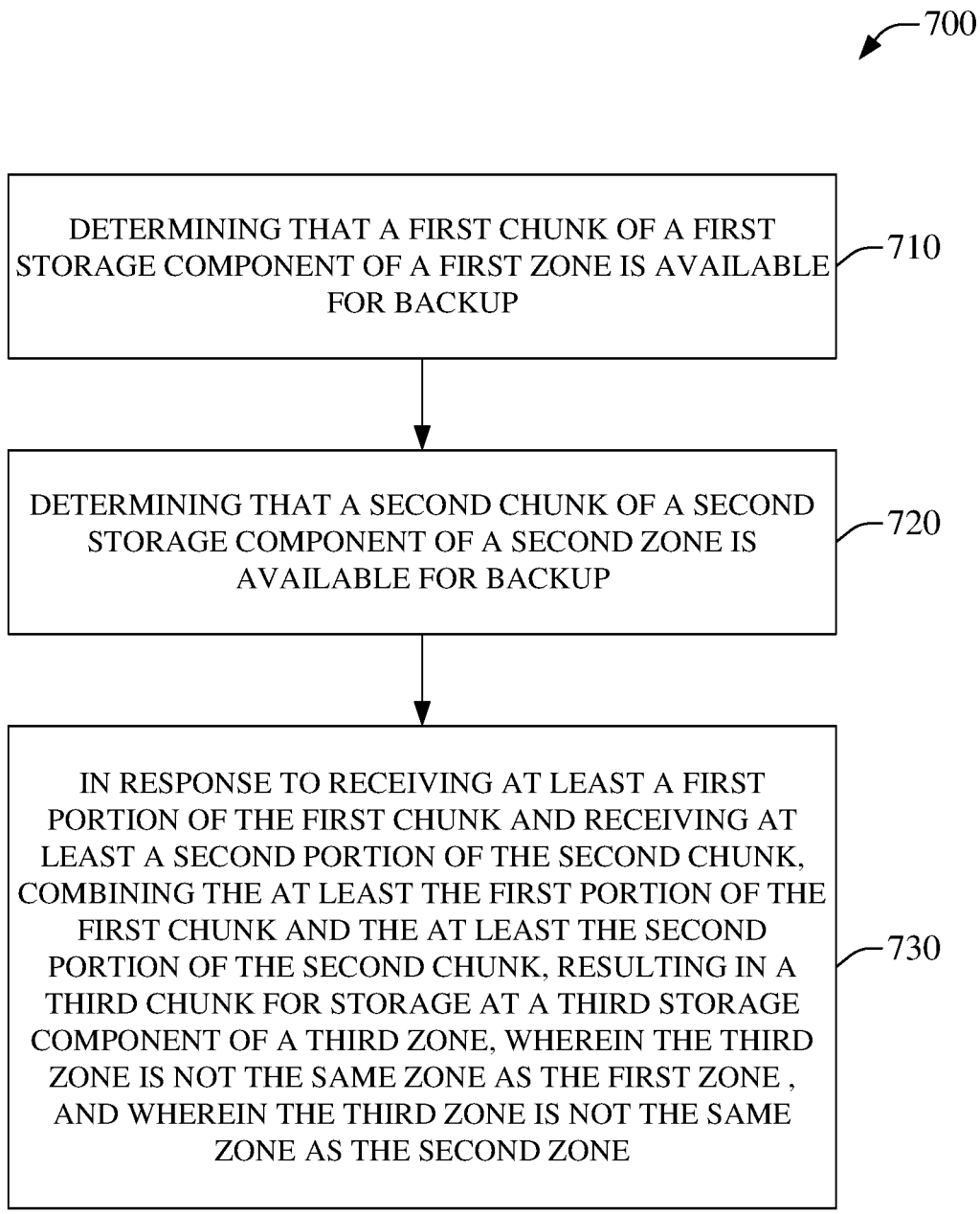
FIG. 7 is an illustration of an example method facilitating data convolution for geographically diverse storage, in accordance with aspects of the subject disclosure.
Figure 8:
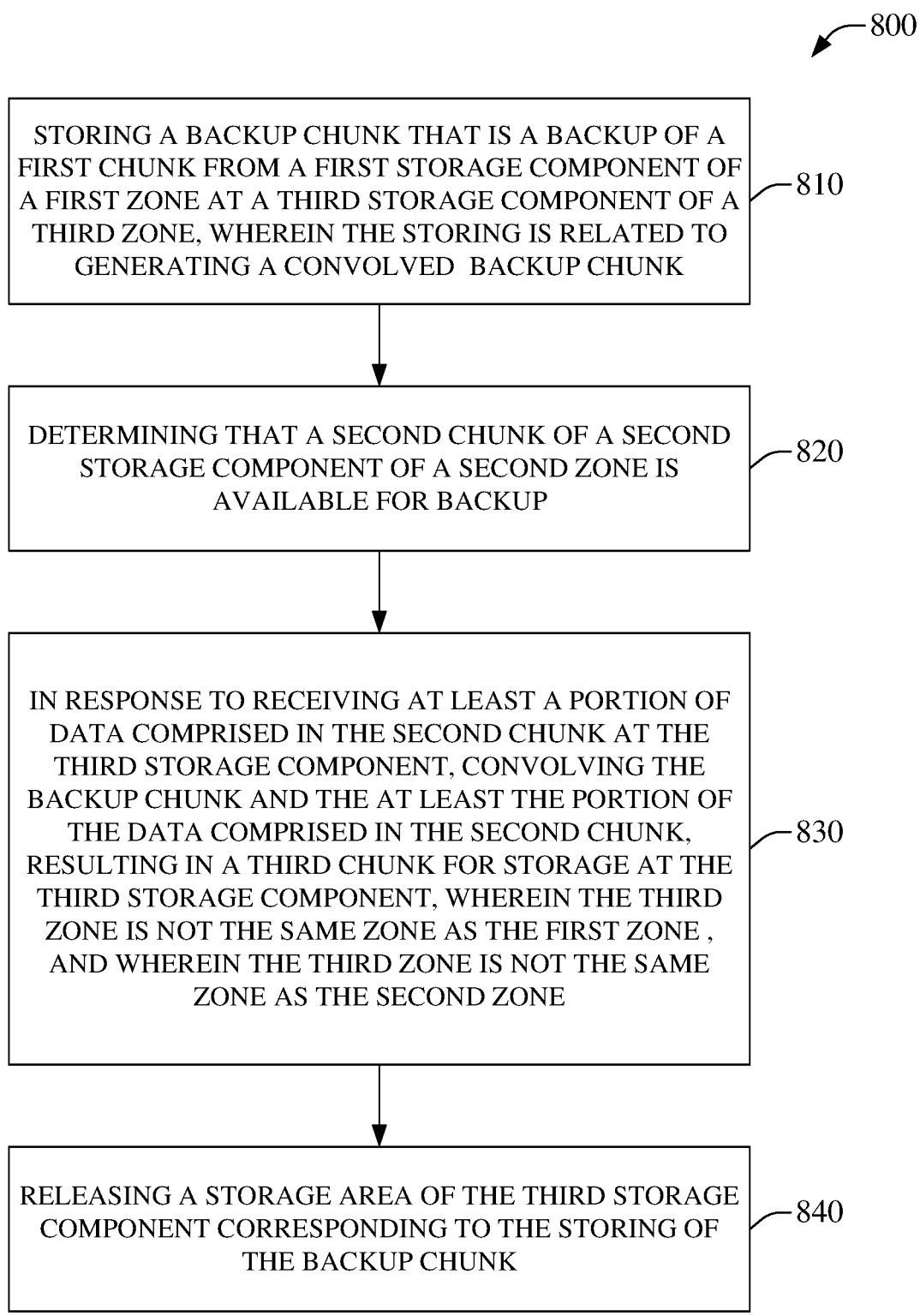
FIG. 8 illustrates an example method that enables data convolution for geographically diverse storage with reduced pre-convolution data replication and release of release of memory allocated to pre-convolution replicated data, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate data convolution for geographically diverse storage, in accordance with aspects of the subject disclosure. At 710, method 700 can comprise determining that a first chunk of a first storage component of a first zone is available for backup. The first chunk, or at least a portion of the data of the first chunk, can be backed up, e.g., replicated, duplicated, copied, etc., in a geographically diverse manner, e.g., at a storage device located remotely from the first storage component of the first zone. Moreover, the backup of the data of the first chunk can be a backup that is compressed with other data. In an aspect, the compression of the data of the first chunk can be convolution, such as by an XOR operation, with data of a second chunk as disclosed elsewhere herein.

At 720, method 700 can comprise determining that a second chunk of a second storage component of a second zone is available for backup. The second chunk, or at least a portion of the data of the second chunk, can be backed up in a geographically diverse manner. Moreover, the backup of the data of the second chunk can be a backup that is compressed with other data. In an aspect, the compression of the data of the first chunk can be a convolution, such as by an XOR operation, with data of another chunk, e.g., the first chunk, a third chunk, etc., as disclosed elsewhere herein.

At 730, a third chunk can be created that is a combining of at least a first portion of the data comprised in the first chunk and at least a second portion of the data comprised in the second chunk. At this point method 700 can end. The third chunk can be stored at a third storage component of a third zone. The third zone can be a different zone than the first zone. The third zone can be a different zone than the second zone.

In some embodiments, method 700 can comprise forming a replicate of the first and/or second chunks at the third zone before compressing these replicates into the third chunk. These embodiments can be viewed as similar to, or the same as, is illustrated in system 100 and example system states 500-504. In some embodiments, local replicates of chunks can be formed in respective zones, e.g., the first chunk can be replicated in the first zone, the second chunk can be replicate in the second zone, a replicate of either the first or second chunk formed at the third zone can be further replicated at the third zone, etc. In other embodiments, a replicate of the first and/or second chunks need not be created at the third zone, and the compression can occur as an on-arrival compression, e.g., similar to, or the same as, is illustrated in system 300, 400, etc., and example system states 600-604. Moreover, replicates of the third chunk can be made at the third zone in certain embodiments.

FIG. 8 is an illustration of an example method 800, which can enable data convolution for geographically diverse storage with reduced pre-convolution data replication and release of release of memory allocated to pre-convolution replicated data, in accordance with aspects of the subject disclosure. At 810, method 800 can comprise storing a backup chunk at a third storage component of a third zone. The backup chunk can be a backup, e.g., replicate, etc., of a first chunk from a first storage component of a first zone. The storing of the backup chunk can be related to generating a convolved backup chunk. The convolved backup chunk can be formed in the third zone, e.g., via the third storage component.

At 820, method 800 can comprise determining that a second chunk of a second storage component of a second zone is available for backup. The second chunk, or at least a portion of the data of the second chunk, can be backed up in a geographically diverse manner. Moreover, backing up of the data of the second chunk can be via the convolved backup chunk, such as by an XOR operation, with data of another chunk, e.g., backup chunk from 810 that is a backup of the first chunk.

At 830, in response to receiving at least a portion of the data comprised in the second chunk at the third storage component, convolving the backup chunk and the at least the portion of the data comprised in the second chunk can occur. This can result in a third chunk for storage at the third storage component. The third zone can be a different zone than the first zone. The third zone can be a different zone than the second zone. The third chunk can comprise a convolution of data from the first chunk and the second chunk.

At 840, storage area of the third storage component corresponding to the storing of the backup chunk from 810 can be released. At this point, method 800 can end. Releasing the storage area can be viewed as deleting the backup chunk or otherwise allowing reuse of the storage area previously comprising the data of the backup chunk stored on the third storage component.

Figure 9:
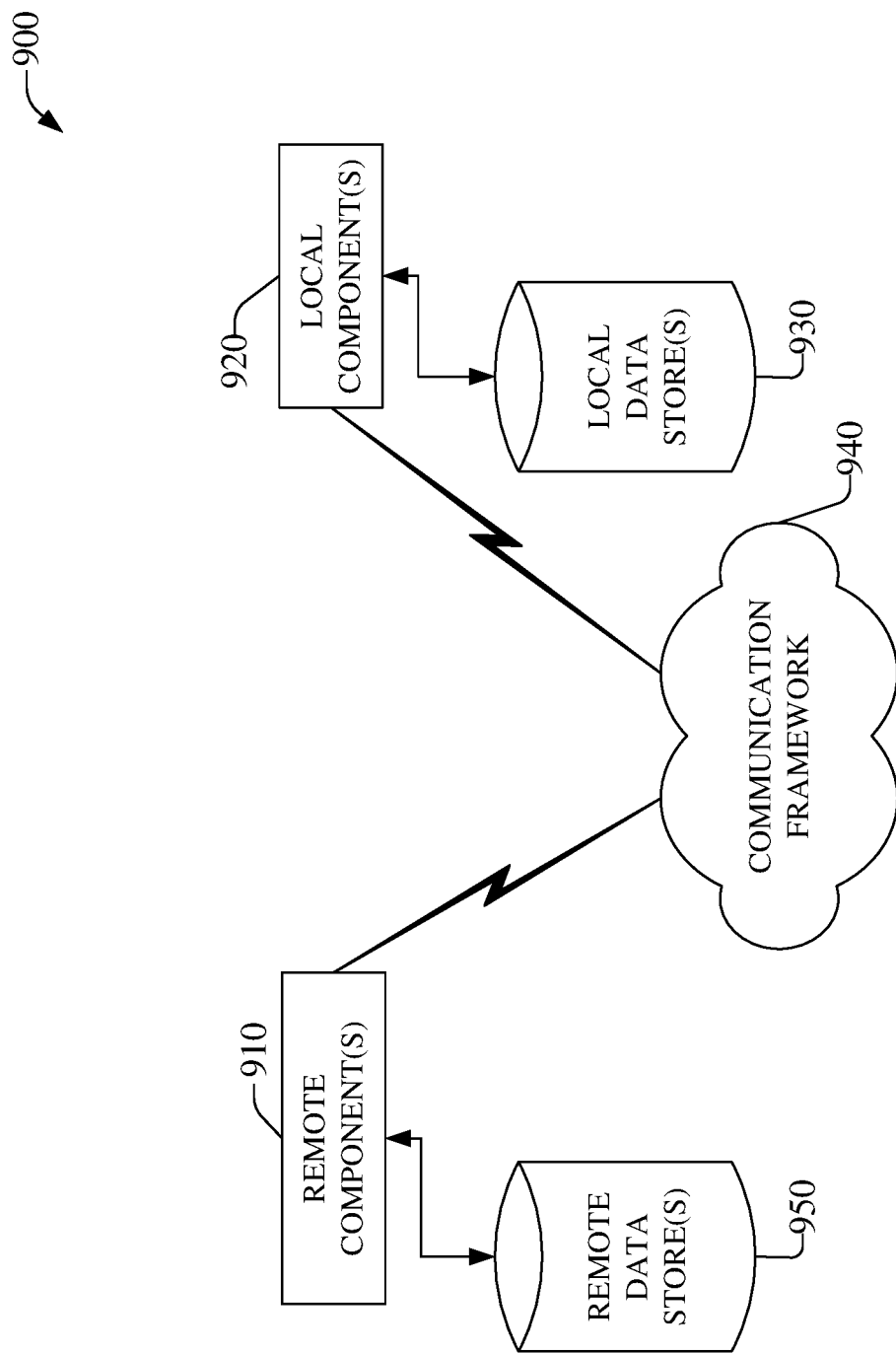
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located ZSC connected to a local ZSC via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local ZSC connected to a remote ZSC via communication framework 940. In an aspect the remotely located ZSC or local ZSC can be embodied in ZSC 110-130, ZSC 210-230, ZSC 310-330, ZSC 410-430, ZSC 510-530, ZSC 610-630, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, information corresponding to chunks stored on ZSCs can be communicated via communication framework 940 to other ZSCs of a storage network, e.g., to facilitate compression and storage in partial or complete chunks on a ZSC as disclosed herein.

Figure 10:
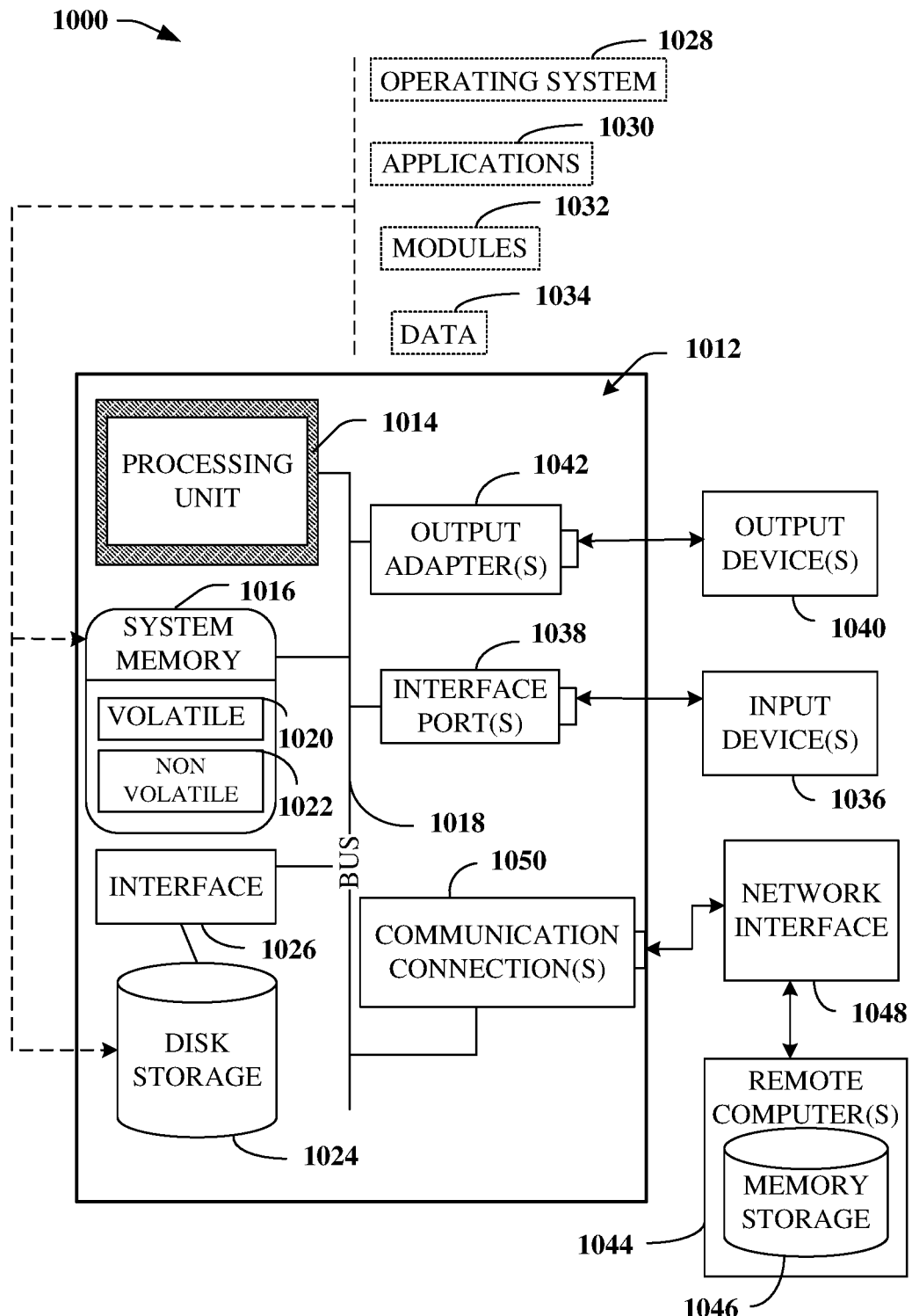
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a ZSC, e.g., 110-130, 210-230, 310-330, 410-430, 510-530, 610-630, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising storing a compressed group of chunks from first ZSCs, e.g., 110-130, 210-230, 310-330, 410-430, 510-530, 610-630, etc., as a partial or complete chunk at another ZSC, e.g., 110-130, 210-230, 310-330, 410-430, 510-530, 610-630, etc., as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving, at a third zone storage component of the system, at least a first portion of first data comprised in a first data chunk from a first zone storage component of the system, wherein the first data chunk is immutable;
generating, at the third zone storage component, a replica of the first portion of the first data, resulting in a fourth data chunk stored on one or more hard disks at the third zone storage component, wherein the fourth data chunk is immutable;
receiving, at the third zone storage component, at least a second portion of second data comprised in a second data chunk from a second zone storage component of the system, wherein the second data chunk is immutable; and
generating a third data chunk at the third zone storage component based on the fourth data chunk and the at least the second portion of the second data, wherein the generating excludes creating a local copy of the second data chunk at the third zone storage component, and wherein the third data chunk is distinct from the fourth data chunk.

2. The system of claim 1, wherein the system is a distributed storage system, wherein the first zone storage component corresponds to a first zone of the distributed storage system, wherein the third storage component corresponds to a third zone of the distributed storage system, and wherein the first zone is a different zone than the third zone.

3. The system of claim 2, wherein the second zone storage component corresponds to a second zone of the distributed storage system, and wherein the second zone is a different zone than the third zone.

4. The system of claim 2, wherein the third data chunk is replicated as a fourth data chunk.

5. The system of claim 4, wherein the fourth data chunk is stored at a fourth zone storage component corresponding to the third zone of the distributed storage system, and wherein the third zone storage component is a different storage component than the fourth zone storage component.

6. The system of claim 1, wherein the third data chunk results from an XOR combination of at least the first portion of the first data and at least the second portion of the second data.

7. The system of claim 2, wherein the operations further comprise, in response to the receiving at least the first portion of the first data, generating a fourth data chunk at the third zone storage component, the fourth data chunk being a replication of the first data chunk.

8. The system of claim 7, wherein the operations further comprise, in response to the generating the third data chunk, deleting the fourth data chunk.

9. The system of claim 8, wherein the third data chunk is replicated as a fifth data chunk stored at a fourth zone storage component corresponding to the third zone of the distributed storage system, and wherein the third zone storage component is a different storage component than the fourth zone storage component.

10. The system of claim 1, wherein the local copy of the second portion of the second data is a second local copy, wherein the operations further comprise creating a first local copy of the first data chunk at the third zone storage component in response to receiving the first portion of the first data, and wherein the generating the third data chunk comprises convolving the first local copy of the first data chunk with the second portion of the second data in response to arrival of the second portion of the second data at the third zone storage component.

11. The system of claim 1, wherein the first zone storage component, the second zone storage component, and the third zone storage component are geographically distinct.

12. A method, comprising:
in response to receiving, by a system comprising a processor and a memory, at least a first portion of first data comprised in a first data chunk from a first zone storage component corresponding to a first zone of a distributed storage system, generating a first replica of the first data chunk based on at least the first portion of the first data, resulting in a fourth data chunk stored on a third zone storage component corresponding to a third zone of the distributed storage system, wherein the third zone is a different zone than the first zone, and wherein the first data chunk and the fourth data chunk cannot be modified;
receiving, by the system, at least a second portion of second data comprised in a second data chunk from a second zone storage component corresponding to a second zone of the distributed storage system, wherein the second zone is a different zone than the first zone, wherein the second zone is a different zone than the third zone, and wherein the second data chunk cannot be modified; and
generating, by the system, a third data chunk based on the fourth data chunk and at least the second portion of the second data, wherein the generating does not result in a second replica of the second data chunk, wherein the third data chunk is stored on the third zone storage component, and wherein the third data chunk is distinct from the fourth data chunk.

13. The method of claim 12, wherein the generating the third data chunk comprises convolving the fourth data chunk and at least the second portion of the second data.

14. The method of claim 13, wherein the convolving is via an XOR function.

15. The method of claim 12, further comprising, in response to the generating the third data chunk, releasing, by the system, storage space of the third zone storage component corresponding to storing the fourth data chunk.

16. A non-transitory machine-readable storage medium, comprising executable instructions that, when executed by a processor, facilitate performance of operations, comprising:
generating a fourth data chunk based on at least a first portion of first data comprised in a first data chunk from a first zone storage component corresponding to a first zone of a distributed storage system, wherein the first data chunk and the fourth data chunk are unmodifiable, wherein the fourth data chunk is a copy of the first data chunk, wherein the fourth data chunk is stored on a third zone storage component corresponding to a third zone of the distributed storage system, and wherein the third zone is a different zone than the first zone; and
generating a third data chunk based on the fourth data chunk and at least a second portion of second data comprised in a second data chunk from a second zone storage component corresponding to a second zone of the distributed storage system without creating a local copy of the second data chunk on the third zone storage component, wherein the second data chunk is unmodifiable, wherein the second zone is a different zone than the first zone, wherein the second zone is a different zone than the third zone, wherein the third data chunk is stored on the third zone storage component, and wherein the third data chunk is distinct from the fourth data chunk.

17. The non-transitory machine-readable storage medium of claim 16, wherein the generating the third data chunk comprises convolving the fourth data chunk and at least the second portion of the second data.

18. The non-transitory machine-readable storage medium of claim 17, wherein the convolving is performed by applying an XOR logic to the fourth data chunk and at least the second portion of the second data.

19. The non-transitory machine-readable storage medium of claim 16, wherein the operations further comprise, in response to the generating the third data chunk, deleting the fourth data chunk.

20. The non-transitory machine-readable storage medium of claim 16, wherein the operations further comprise generating a copy of the third data chunk, resulting in a fifth data chunk, wherein the fifth data chunk is stored on a fourth zone storage component corresponding to the third zone of a distributed storage system, and wherein the fourth zone storage component is a different zone storage component than the third zone storage component.

\* \* \* \* \*